H. Knight,
Tile Machine,
No. 33,152.    Patented Aug. 27, 1861.
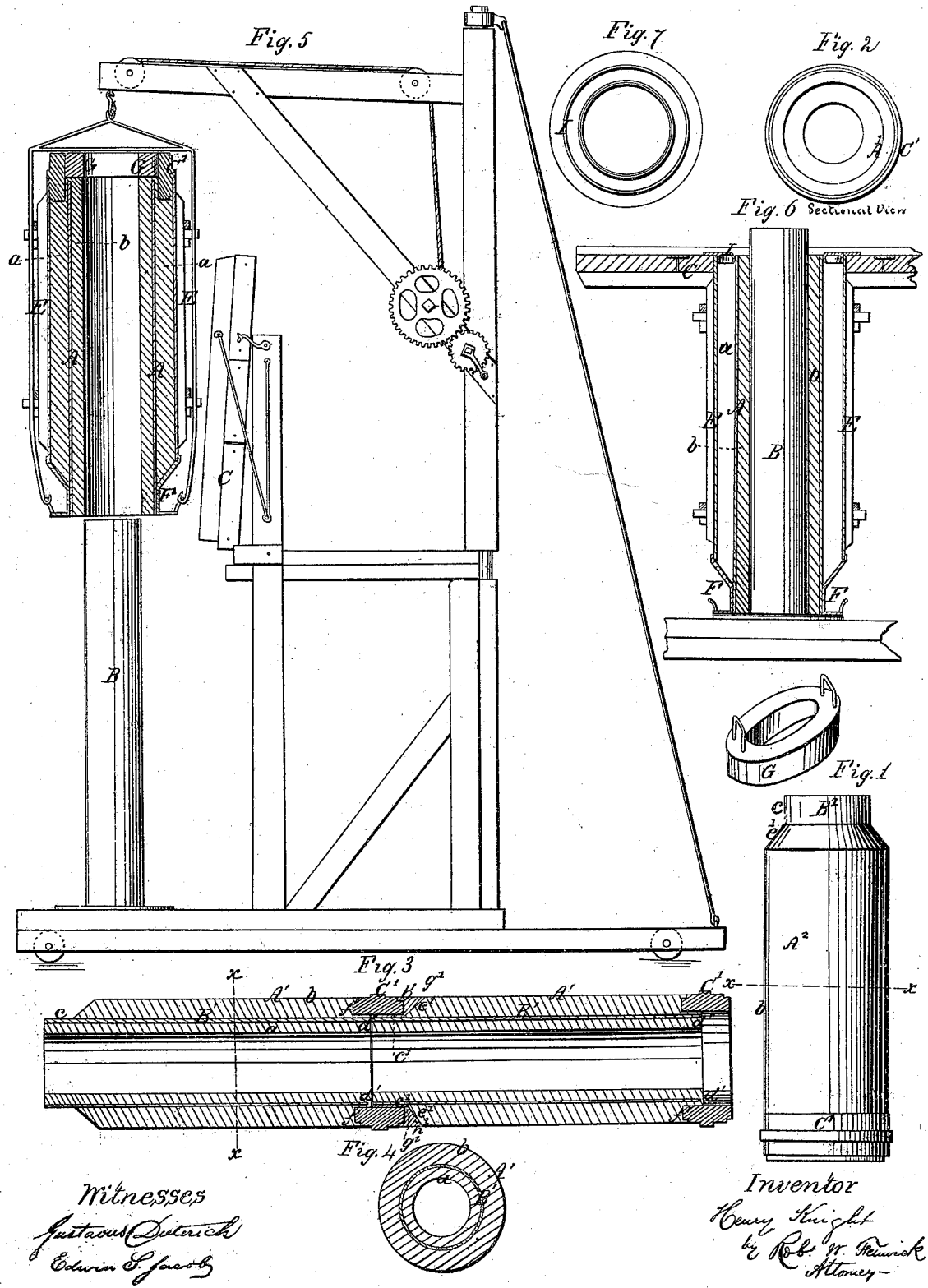
Witnesses
Gustavus Dieterich
Edwin S. Jacoby
Inventor
Henry Knight
by Robt. W. Fenwick
Attorney

UNITED STATES PATENT OFFICE.

HENRY KNIGHT, OF JERSEY CITY, NEW JERSEY.

IMPROVEMENT IN COMBINATION CEMENT AND METAL PIPES.

Specification forming part of Letters Patent No. 33,152, dated August 27, 1861.

*To all whom it may concern:*

Be it known that I, HENRY KNIGHT, of Jersey City, in the county of Hudson and State of New Jersey, have invented or produced a new and Improved Molded Combination Cement and Metal Pipe; and I do hereby declare that the following is a full, clear, and exact description of the same, reference being had to the accompanying drawings, forming part of this specification, in which—

Figure 1 is an outside elevation of one section of my improved pipe; Fig. 2, an end view of the same; Fig. 3, a longitudinal section of two sections of my improved pipe coupled together by my improved metal coupling; Fig. 4, a transverse section of the pipe in the line $x\ x$ of Figs. 1 and 3. Fig. 5 is a partial section and side elevation of an apparatus adapted for manufacturing my improved pipe. Fig. 6 is a vertical central section of a portion of said apparatus. Figs. 7 and 8 are detail views of the apparatus.

The nature of my invention consists in a combination cement and metal pipe, with or without a metal coupling-band on one of its ends, and which is molded complete in a single mold and at one and the same operation and with the metal portion located intermediate between the inner and outer molded cement surfaces.

To enable others skilled in the art to fully understand my invention, I will describe the same with reference to the drawings and certain means for performing it, said means being those patented to me May 8, 1860, and May 14, 1861.

A′ in the drawings represents a molded section of hydraulic-cement pipe with a sheet-metal tube B′ molded in it intermediate between its inner and outer circumferences $a\ b$, and with a metal coupling-band C′ molded in and on one of its ends. The inner surface of the metal tube is covered from end to end with cement, while the outer surface thereof, at the end $c'$, is left exposed for about an inch (more or less) and at the other end $d'$ is very thinly covered. The cement at the end $c'$ and on the outer surface of tube B′ terminates with a bevel $e'$ and at the end $d'$ with an angular socket $f'$. Into the socket the metal coupling-band C′ is molded, said band being of greater diameter than the tube B and encircling the exposed end $c'$ thereof when two sections of the pipe are coupled together in the manner shown in Fig. 3.

It will be seen from the drawings that when the ends of the pipe-sections are thus together a space $g'$ exists between the coupling-band C′ and the end $c'$ of the tube B′, and also between the inner end of the band and the beveled end of the outer cement covering. Into this space a suitable soft composition $h'$ is placed for the purpose of cementing and making water-tight and permanent the joint between the sections, as shown.

Combination cement and metal pipe such as described and represented is much cheaper and more durable and useful than ordinary uncovered cast-iron pipe, cement being less expensive than cast-iron, not liable to destruction by corrosion, and does not impart a bad taste to the water flowing through it. Combination cement and metal pipe such as described is also cheaper and superior to the well-known combination iron and cement pressure-pipe, because pipe formed with inner and outer cement surfaces and strengthened between said surfaces by metal after my plan is sold in the market all ready for use, being completed at one operation in one mold and having an equable distribution of cement on both sides, which admits of its being tested before it is laid in the trench, whereas the cement pressure-pipe is not lined or covered on the outside until after it is laid in the trench, (there never, to my knowledge, having been any means devised previously to my patents of May 8, 1860, and May 14, 1861, for coating both sides in the mold and at one operation,) at which stage the cement is plastered under and over the tube in such an unequable manner that a larger quantity of cement is required than is used in molding my pipe, and, besides this, many inconveniences from putting on the cement after the pipe is laid in the trench are experienced, rain, heat, &c., often destroying or injuring the work before it is completed or while the cement is soft.

The finishing of cement pipe with a metal coupling-band, as I have described, also greatly enhances its utility, as it can be as readily tapped through said band as can be the ordinary cast-iron pipe. Without the band much larger openings in tapping are required to be cut and destruction of the cement pipe often ensues. At least a greater amount of delay and labor are experienced.

The improvements which I have made in molded combination cement and metal pipe constitute it an improved new article of manufacture, in contradistinction to the ordinary combination metal and cement pressure-pipe covered by molding only on the inside with cement and afterward finished in the trench, and also from the cast-iron pipe, which is also only glazed or enameled on its inside, and likewise from the ordinary molded cement pipe, which has no metal between its outer and inner surfaces and is not finished at its end with a metal coupling-band.

To mold the combination cement and metal pipe and finish its end with a metal coupling-band, I recommend the employment of a central stationary core B, an adjustable hinged table C, cylindrical mold E, made in two halves and hinged and hooked together, and a detachable collar G and a base-piece F, substantially as described in Letters Patent to me May 8, 1860, and also a sheet-metal pipe A and a flanged centering device I, substantially as described in Letters Patent granted to me May 14, 1861. I, however, do not limit myself under this patent to any means for producing the pipe described.

The core B, mold E, pipe A, and table C being arranged and adjusted in the relation to each other shown in Fig. 6, the centering-cap I is placed on top of the mold and the pipe A, and when thus placed communication from the top with the space $a$ between the mold and the pipe A is cut off; but a free communication with the space $b$ between the core B and the pipe A is allowed. The cement is now introduced into the space $b$ and rammed compactly into said space and around the core. The cap I can now be removed, as the cement between the pipe A and the core will prevent the pipe from changing position. Cement is now introduced into the space $a$ between the mold and pipe A and rammed to a high degree, except near the top of the mold. At this stage of the process a cast coupling-band C' is introduced at the top of the mold and forced down into the soft cement a short distance. The detachable collar G is next introduced between the metallic coupling-band and the upper portion of the core B and forced down and revolved until the top edge of the cement coating of the pipe A is squared off and made solid. The pipe is now completed and is lifted from the core, as illustrated in Fig. 5, by means of a derrick and deposited upon a suitable stand, the mold being opened and moved away from it ready for another operation.

What I claim as my invention, and desire to secure by Letters Patent, is—

A molded combination cement and metal pipe, with or without a metal coupling-band on one of its ends, substantially as described, which is molded complete in a single mold at one and the same operation, with its metal portion A intermediate between its inner and outer molded cement surfaces.

HENRY KNIGHT.

Witnesses:
JAMES MCDONOUGH,
JAMES CRAWFORD.